Oct. 30, 1956 W. S. BANZHOF, JR., ET AL 2,769,143
AUTOMATIC FEEDING MECHANISM
Filed May 10, 1954 3 Sheets-Sheet 1
FIG 1
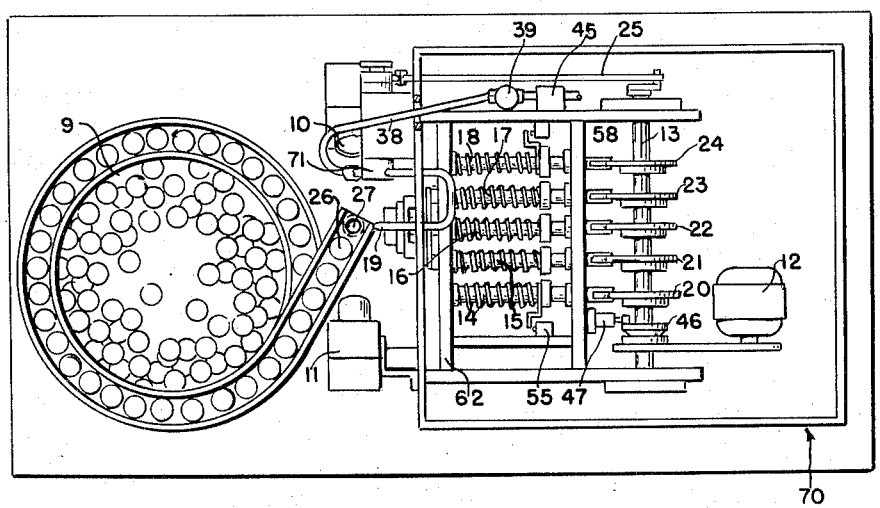
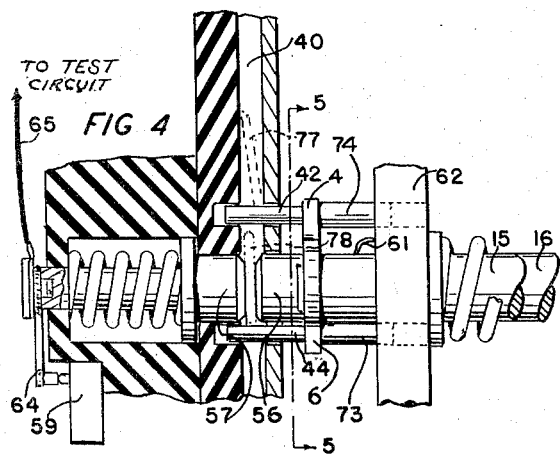
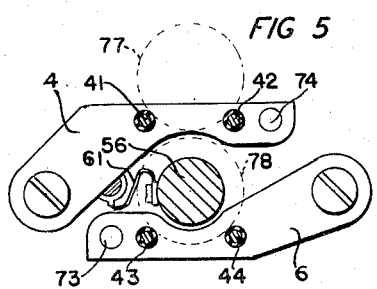
INVENTORS
W. S. BANZHOF JR.
J. A. HOSFORD
BY
*W. C. Parnell*
ATTORNEY

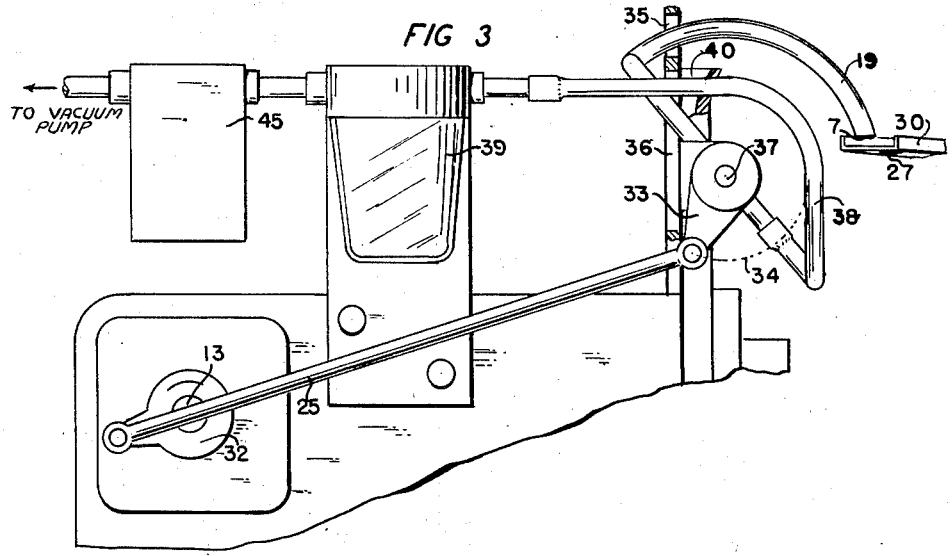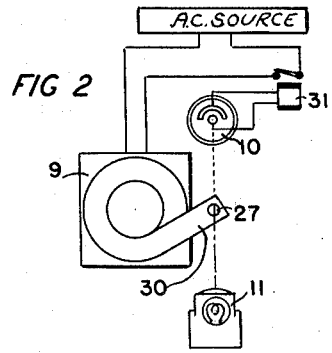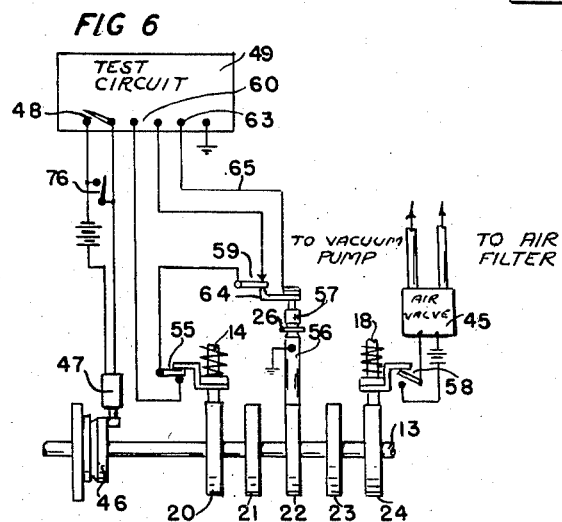

Oct. 30, 1956   W. S. BANZHOF, JR., ET AL   2,769,143
AUTOMATIC FEEDING MECHANISM
Filed May 10, 1954   3 Sheets-Sheet 3
FIG 7
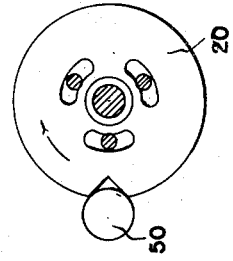
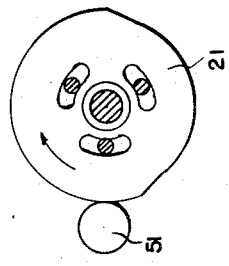
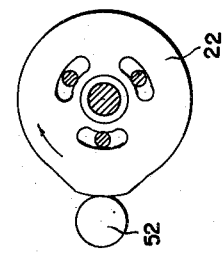
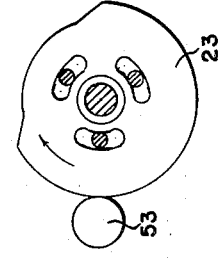
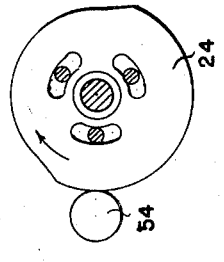
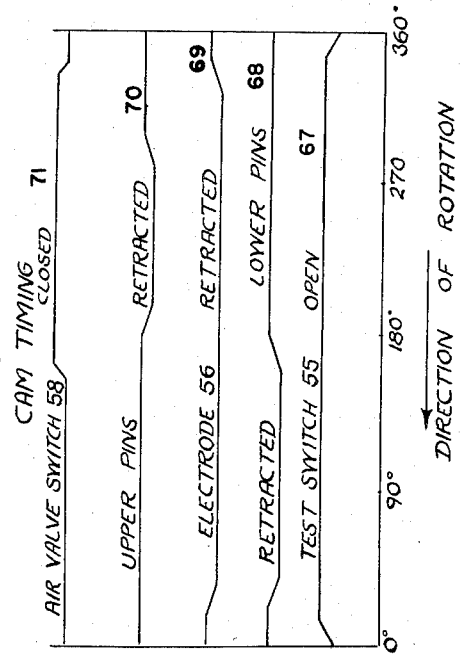
INVENTORS
*W. S. BANZHOF JR.*
*J. A. HOSFORD*
BY
ATTORNEY

United States Patent Office 2,769,143
Patented Oct. 30, 1956

2,769,143

AUTOMATIC FEEDING MECHANISM

William S. Banzhof, Jr., and James A. Hosford, Bethlehem, Pa., assignors to Western Electric Company, Incorporated, New York, N. Y., a corporation of New York Application May 10, 1954, Serial No. 428,780

6 Claims. (Cl. 324—158)

This invention relates to testing apparatus and particularly to apparatus for automatically testing electrical elements.

In the large-scale manufacture of electrical impedance elements, it is of course, necessary and common practice to test each of the elements in order that they may be separated into groups depending on whether some property of each element is within or outside of acceptable limits. Heretofore fragile elements such as varistor discs which are thin and brittle, were fed manually to test apparatus since they were not rugged enough to withstand the rough treatment encountered with available automatic apparatus.

The object of this invention is an automatic apparatus for feeding such elements successively to a test position without damage thereto.

In accordance with the general features of the invention, articles to be tested are delivered singly to a pick-up position from which they are successively transferred to a first support means in a pre-test position from which they are released, as needed, to a second support means in a test position where the articles are connected into a test circuit. At the conclusion of the test, the tested article is released from the test position and the article in the pre-test position is transferred thereto.

Each such cycle of operations may be initiated in response to a signal sent out by the associated test apparatus at the end of each test so that the apparatus functions independently of the duration of the test.

These signals may actuate a suitable device such as a single revolution clutch to produce one cycle of operation of each of a series of devices such as cams, which in proper sequence and timed relation, actuate means for performing the required series of operations.

According to another feature of the invention, the support means for the pre-test and test positions comprise pairs of pins of rubber or similar resilient material which, besides cushioning the fall of the articles thereon, also resist abrasion by the articles.

The above and further features of the invention will be fully understood from the following detailed description of the particular embodiment as shown in the drawing, in which:

Fig. 1 is a plan view of a device for single feeding varistor discs;

Fig. 2 is a schematic diagram of the control circuit for the vibratory type feeder of the device of Fig. 1;

Fig. 3 is a side elevational view of the vacuum pick-up member and actuator therefor;

Fig. 4 is a side elevational view of the test electrodes and associated apparatus;

Fig. 5 is a sectional view as seen along the plane of line 5—5 of Fig. 4;

Fig. 6 is a schematic diagram of the camshaft and the associated control circuits, and Figs. 7 and 8 show the cams and their relative timing sequence respectively.

Referring now to the drawing, as seen in Fig. 1 the system briefly described comprises suitable means such as a known type of vibratory elevator feeder 9 for advancing the articles to a control or pick-up point; means in this case a photo-electric cell 10 cooperating with light source 11, for controlling the operation of feeder 9; and a driver 12 connected through a single revolution clutch 46, for the shaft 13 which reciprocates rod 25 and rotates cams 20 through 24 inclusively for sequentially actuating spring-biased push rods 14 through 18 respectively. The rod 25 reciprocates a vacuum pick-up member 19 which transfers the discs from the pick-up point at the end of track 30 to a funnelled chute 40 in which the varistor discs are sequentially positioned in a stacking or pre-test position and a test position.

As seen in Fig. 2, applicant has provided a photo-electric cell control circuit for automatically de-energizing the feeder 9 when a disc 26 is moved over the hole 27 in the end of the track 30 at the control position. The photo-electric cell 10 is normally energized by the light beam from source 11 which beam passes through the hole 27. When a disc 26 moves over hole 27 to interrupt the light beam, the photo-cell 10 ceases to conduct and relay 31 is de-energized to release its contact thereby opening the energizing circuit for the feeder 9. The feeder will remain de-energized until the disc 26 is removed from the end of the track 30 at which time the feeder again will operate until the next disc is moved over the hole.

The vacuum pick-up mechanism shown in Fig. 3 utilizes a crank 32 driven by the camshaft 13 for driving the rod 25 to reciprocate the pick-up element 19. For each revolution of the crank 32 the crank 33 for the pick-up element is reciprocated along the arcuate path 34 so that the end of the pick-up element 19 is moved about 90° in a counterclockwise direction from its initial position over the hole 27 at the end of track 30 as shown, to a position within an aperture 35 therefor in a vertical front plate 36 of a main housing 70 for the apparatus.

The pick-up element 19 is a bent, metal tube having an open end 7 which as seen in Fig. 1, is secured to a member 71 on the end of shaft 37 for the crank 33. A flexible tubing 38 connects tubular element 19 to a vacuum pump through a filter 39 and a solenoid actuated air valve 45. The air valve 45 is provided to disconnect element 19 from the vacuum pump and open it to the atmosphere so that a disc adhering thereto may be dropped therefrom.

The discs 26 are dropped into a funnelled chute 40 and successively fall on to movable rubber support pins 41 and 42 in a pre-test or stacking position and from there to pins 43 and 44 which locate the disc in test position. The relative positioning of the discs is shown by the dashed lines 77 and 78 in Fig. 5. The pre-test position is provided to speed up the feeding to the test position, the distance between the pre-test and test pin positions being small as compared with the distance from the pick-up element to the pre-test position. The time required for each fall within the chute 40 is substantially proportional to these distances. The feeding cycle time can therefore be speeded up and is limited by the time required for the short drop between pin positions rather than the longer time required for dropping the disc from the pick-up member.

As seen in Fig. 1 motor 12 drives camshaft 13 through single revolution clutch 46 which is actuated by solenoid 47 which in turn is energized when contacts 48 in the test circuit (shown schematically as box 49 in Fig. 6) are closed at the completion of the test. When the solenoid 47 is energized, the clutch 46 will thereupon become engaged to rotate shaft 13 for one complete revolution.

The "zero" or start position for cams 20 through 24 and their respective followers 50 through 54 respectively is shown in Fig. 7. Each of the spring-biased push rods 14 through 18 to which the followers 50 through 54 respectively are rotatably connected is sequentially moved to perform the following operations: Rod 14 actuates switch 55 which is the test circuit switch; rods 15 and 17 move the lower and upper pin support brackets 6 and 4 which control the retraction of the pre-test position and the test position disc support pins respectively; rod 16 moves test electrode 56 to clamp the disc in test position between it and the spring mounted electrode 57 and rod 18 operates switch 58 which controls the actuation of the air valve 45.

As seen in Fig. 5 the movable electrode 56 is connected to ground potential by the wire conductor 61 attached to a fixed support member 62 for the push rods 14 to 18 inclusively, member 62 also being provided with guide holes for pins 73 and 74 on brackets 6 and 4 respectively. The resiliently mounted electrode 57 (Fig. 4) is connected to terminal 63 of the test circuit as seen in Fig. 6 by wire 65. This electrode 57 is provided with an actuator 64 for normally open switch 59 which is connected in series with the test circuit switch 55. When a disc is in test position and electrode 56 is pushed out (zero position of the cams) the resilient electrode 57 will be moved to close switch 59. The switch 55 is also closed at this time by cam 20 and the test circuit is thereby energized. It is seen, therefore, that in order for the test circuit to be energized it is necessary that a disc be in test position and that the cams be at zero position. When the supply of discs to be tested is exhausted then, the apparatus will automatically stop. To restart, switch 76 for the solenoid 47 may be operated manually until a disc is located in test position when automatic operation will be resumed.

Fig. 8 discloses the sequence of cam actuation, lines 67 through 71 representing the camming surfaces of cams 20 through 24 respectively. From this it is seen that at zero degrees, which is the "Start" or test position for the cams, cam 24 (line 71) is in a position where the air valve switch 58 is open to permit the vacuum member 19 to pick up a disc from track 30 since at 0° member 19 is directly over the disc at the end of the track; the upper pins are in their extended position (line 70) to hold a disc thereon; the movable test electrode 56 is in the advanced or test position (line 69) holding a disc in contact with the electrode 57; the lower pins are in the extended position (line 68); and the test switch 55 is closed (line 67) to energize the test circuit. When the test on the disc has been completed, contacts 48 in the test circuit, which may be contacts of a relay energized at the completion of the test, are closed. Solenoid 47 is thereupon actuated and the shaft 13 starts to rotate. As seen in Fig. 8 almost immediately, at about 13°, test switch 55 opens de-energizing the test circuit and the electrode 56 is retracted. At about the same time, the lower pins are retracted allowing the tested disc to fall free and be sorted according to the results of the test. The sorting means are not disclosed herein as they are of conventional design such as disclosed, for instance, in U. S. Patent 2,468,843, issued May 3, 1949, to D. E. Sunstein. At slightly less than 180° rotation of the camshaft, when the disc on the end of the pick-up member is substantially over the funnelled opening of chute 40, which guides the disc to the pin positions, the air valve switch 58 is closed to actuate air valve 45 to open the vacuum pick-up member 19 to the atmosphere causing the disc to drop therefrom. If the disc does not release immediately from the member, it will be brushed off when the end of the member 19 passes through aperture 35 in the panel 36, the aperture being smaller than the disc. The disc will drop into the chute. In the meantime, the lower pins are pushed out and the upper pins retracted to drop a disc from the upper pins to the lower pins, the upper pins being pushed out again at about 280° before the disc passing down the chute arrives at the pre-test position. Thereafter, at about 340° the test electrode 56 is pushed out and air valve switch 58 is opened to enable the transfer member 19 to pick up the next disc. At the conclusion of the cycle the test switch 55 is closed and the single revolution clutch is disengaged until the completion of the test.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a testing apparatus, means for delivering articles to be tested singly to a pick-up position, a shaft having a plurality of cams, a source of power, a single revolution clutch for connecting the source to the shaft, means subject to control by a test signal for engaging the clutch, means for supporting articles in a pre-test position, means actuated by the shaft for transferring an article from the pick-up position to the pre-test position, testing electrodes and means for supporting an article in test position between the electrodes, a first cam on the shaft for moving the electrodes into pressure contact with an article therebetween, means controlled by a second cam on the shaft for releasing the article from between the electrodes, means controlled by a third cam on the shaft for transferring an article from the pre-test position to the test position and a fourth cam on the shaft for energizing a test circuit while the electrodes make pressure contact with an article.

2. In a testing apparatus feeding means for delivering articles to be tested singly to a pick-up position, means for stopping the feeding means when an article is in the pick-up position, a shaft having a plurality of cams, a source of power, a single revolution clutch for connecting the source to the shaft, means subject to control by a test signal for engaging the clutch, a chute having therein a pre-test and a test position for the articles, means for supporting an article in the pre-test position, two test electrodes, means for supporting an article in test position between the two electrodes, a vacuum pick-up member reciprocated by the shaft for transferring an article from the pick-up position to the chute, a first cam on the shaft for moving the electrodes into pressure contact with an article therebetween, means controlled by a second cam on the shaft for releasing the article from between the electrodes, means controlled by a third cam on the shaft for transferring an article from the pre-test to the test position and a fourth cam on the shaft for actuating means for energizing a test circuit while the electrodes make pressure contact with an article.

3. In testing apparatus means for delivering articles to be tested singly to a pick-up position, a shaft, a source of power, a single revolution clutch for connecting the source to the shaft, means subject to control by a test signal for engaging the clutch, a first support for supporting an article in a pre-test position, a second support for supporting an article in a test position, means for connecting an article in test position in a test circuit, and means controlled by the shaft for actuating the second support to release an article from test position when a test has been completed thereon, for actuating the first support to transfer an article from the pre-test to the test position, for transferring an article from the pick-up position to the pre-test position, and for actuating the means for connecting an article in the test circuit.

4. In apparatus for automatically and successively testing articles in a test circuit, means for delivering articles singly to a pick-up position, a shaft, a source of power, a single revolution clutch for connecting the source to the shaft, means subject to control by a test signal for engaging the clutch, a first support for holding an article in a pre-test position, two test electrodes, a second support for holding an article between the two electrodes, switching means for actuating the test circuit, and means controlled by the shaft for successively actuating the second support to release an article from between the test electrodes when a test has been completed thereon, for actuating the first support to transfer an article from the first to the second support, for transferring an article from the pick-up position to the first support, for moving the electrodes into pressure contact with the article therebetween and for actuating the switching means.

5. In apparatus for automatically and successively testing articles in a test circuit, means for delivering articles singly to a pick-up position, a vacuum member for removing the articles therefrom, means for connecting the member to atmospheric pressure to release an article held thereon, a shaft, a source of power, a single revolution clutch for connecting the source to the shaft, means subject to control by a test signal for engaging the clutch, first support means for holding an article in a pre-test position, two test electrodes, second support means for holding an article between the two electrodes, switching means for actuating the test circuit and means controlled by the shaft for successively releasing an article from the second support means when a test has been completed thereon, for transferring an article from the first to the second support means, for actuating the vacuum member, for actuating the means for connecting the vacuum member to atmospheric pressure to transfer an article therefrom to the first support means, for moving the electrodes into pressure contact with the article therebetween and for actuating the switching means.

6. In a testing apparatus means for delivering articles to be tested singly to a pick-up position, means for removing an article from the pick-up position, a shaft, a source of power, a single revolution clutch for connecting the source to the shaft, means subject to control by a test signal for engaging the clutch, means for supporting an article in a pre-test position, a first movable electrode, a second resiliently mounted electrode, means for supporting an article between the electrodes, a first test circuit switch operable by the second electrode, a second test circuit switch connected in series with the first switch and means controlled by the shaft for releasing an article from test position when a test has been completed thereon, for transferring an article from the pre-test to the test position, for actuating the means for removing an article from the pick-up position to transfer an article therefrom to the pre-test position, for moving the first electrode into pressure contact with the article thereby pushing it against the second resilient electrode, and for actuating the second switch to energize the test circuit, the first switch being actuated by the movement of the article against the second electrode.

References Cited in the file of this patent
UNITED STATES PATENTS

| | | |
|---|---|---|
| 1,984,031 | Purdy et al. | Dec. 11, 1934 |
| 2,440,480 | Lewis | Apr. 27, 1948 |
| 2,466,002 | Bushcott et al. | Apr. 5, 1949 |